United States Patent [19]

Lee et al.

[11] Patent Number: 5,773,055
[45] Date of Patent: Jun. 30, 1998

[54] PROCESS FOR PREPARING A BEAN FLAVOR

[75] Inventors: Eldon Chen-hsiung Lee, New Milford; John Stewart Tandy, Litchfield, both of Conn.

[73] Assignee: Nestec S.A., Vevey, Switzerland

[21] Appl. No.: 641,590

[22] Filed: May 1, 1996

[51] Int. Cl.$^6$ .............................. A23J 3/14; A23J 3/16; A23L 1/20
[52] U.S. Cl. .............................. 426/44; 426/46; 426/63; 426/629; 426/438
[58] Field of Search ..................... 426/629, 438, 426/44, 46, 63

[56] References Cited

U.S. PATENT DOCUMENTS

| | | | |
|---|---|---|---|
| 4,490,406 | 12/1984 | Ferrero et al. | 162/46 |
| 5,100,679 | 3/1992 | Delrue | 162/46 |
| 5,480,671 | 1/1996 | Nii | 162/46 |

*Primary Examiner*—Steven Alvo
*Attorney, Agent, or Firm*—Pennie & Edmonds

[57] ABSTRACT

A process for preparing a fried bean flavor which comprises preparing a bean paste, hydrolysing the bean paste with a proteinase and a carbohydrase, and reacting the hydrolysed bean paste at an elevated temperature with an edible fat or oil and lecithin.

12 Claims, No Drawings

PROCESS FOR PREPARING A BEAN FLAVOR

BACKGROUND OF THE INVENTION

The present invention relates to a flavor preparation, more particularly to a process for preparing a fried bean flavor.

Deep-Browned bean products having a unique fried bean flavor note derived from frying of beans have achieved popularity among canned bean products in Canada. However, there are several disadvantages of frying: not only does the frying of beans require frying, processing and purifying equipment but the frying oil polymerizes and deteriorates after prolonged frying and the deteriorated frying oil has to be either disposed of or purified for reuse and addition of further fresh oil is required.

SUMMARY OF THE INVENTION

We have devised a process for preparing a fried bean flavor which comprises reacting proteinase- and carbohydrase-hydrolysed bean pastes with an oil and lecithin at elevated temperatures. The fried bean flavor can be added to the canned bean product before retorting but it is also suitable for other food products where a fried bean flavor is desired, e.g. French fried potato or fried seafoods, etc.

According to the present invention, there is provided a process for preparing a fried bean flavor which comprises preparing a bean paste, hydrolysing the bean paste with a proteinase and a carbohydrase, and reacting the hydrolysed bean paste at an elevated temperature with an edible fat or oil and lecithin.

DETAILED DESCRIPTION OF THE INVENTION

Suitable beans employed in the present invention may be, for instance, white beans, soy beans, kidney beans, lima beans, mung beans, snap beans or other related legumes. As will be apparent, the bean employed is advantageously a bean which will generate a specific flavor and aroma profile close to, or closest to, that of the bean used for the canned product.

The bean paste may be prepared by any suitable method, usually involving heating with water and grinding. For instance, the beans may be soaked in water at a temperature from about 15° to 35° C., preferably from 20° to 30° C., blanched and then ground with a sufficient amount of water to form a paste. Alternatively, the beans may be ground firstly to a powder which is then cooked with a sufficient amount of water to form a paste. The amount of water can vary widely but will generally be present in an amount which is greater than the weight of the beans or bean powder. The bean paste may also be made by other non-conventional methods such as microwave heating, supersteam heating or pressure cooking, etc.

The proteinase and carbohydrase used to hydrolyse the bean paste are preferably added in separate steps because they may have different optimum reaction pH and temperatures for their optimum activity and stability. For example, the pH for bacterial alpha-amylase may be from about 5 to about 8 and preferably from 5.4 to 5.8, the pH for fungal alpha-amylase may be from about 3.5 to about 6.5 and preferably from 4.5 to 4.9 while the pH for glucoamylase may be from about 3 to about 6 and preferably from 4.3 to 4.7. The optimum pH for proteases depends on the type of protease varying from acidic, neutral or alkaline proteases.

The pH for a neutral protease may be from about 6 to about 8 and preferably from 7.3 to 7.7 while the pH for an alkaline protease may be from about 6 to about 12 and preferably from 8.1 to 8.5. Although they may be added simultaneously, there is the possibility that the protease may break down some of the carbohydrase. Preferably the carbohydrase is added before the protease.

The carbohydrase is employed to provide a source of reducing sugars from the bean. Examples of carbohydrases which may be used are alpha-amylase, beta-amylase, isoamylase (alpha-1,6-glucosidase) and glucoamylase, preferably a mixture of an amylase, e.g. alpha-amylase and glucoamylase. Alpha-amylase causes liquefaction of the gelatinised starch. The glucoamylase causes saccharification of liquefied starch to glucose due to its exoamylase and debranching activity. Beta-amylase can stepwise break down amylose and amylopectin from the non-reducing end to form maltose as a source of reducing sugar. The alpha-amylase may be derived from fungal or bacterial fermentation. The use of heat-stable amylase from strains of *Bacillus subtilis* that can tolerate temperatures of up to 70° C. is preferred. The glucoamylase is preferably a fungal glucoamylase, e.g. amyloglucosidase, may be obtained by fermentation of *Aspergillus niger, Aspergillus oryzae, Aspergillus Awamori* or *Rhizopus oryzae* and can hydrolyse both 1,4 and 1,6-alpha linkages in starch.

The protease may be of animal, plant or microbial origin and it may include endopeptidases, exopeptidases and/or aminopeptidases preferably with a high degree of bean protein hydrolysis to provide a source of peptides, preferably low molecular weight peptides, and/or amino acids directly from the bean as flavor precursors.

The edible fat or oil used may be any common edible animal fat such as beef tallow, lard, chicken fat, etc. or any common vegetable oil such as soybean oil, corn oil, cottonseed oil, olive oil, peanut oil, palm oil, rapeseed oil, sunflower seed oil, etc. The edible fat or oil chosen may, for instance, the fat or oil which generates a specific flavor and aroma profile close to, or closest to, that of the bean used for the canned product.

The lecithin may be derived from animal or vegetable material such as eggs or soybean. The source of the lecithin may be chosen depending upon the flavor and aroma profiles desired.

The hydrolysed bean paste is reacted with the edible oil and lecithin at a temperature conveniently from about 110° to 300° C., preferably from 125° to 175° C. and especially from 140° to 160° C. The duration of the reaction of the hydrolysed bean paste with the edible oil and lecithin may be from about 1 minute to 48 hours, preferably from 4 minutes to 32 hours, more preferably from 30 minutes to 6 hours and especially from 1 to 3 hours.

The amount of edible oil used in the reaction with the hydrolysed bean paste and lecithin may be from about 5 to 98%, preferably from 10 to 95% and especially from 70 to 95% by weight based on the weight of the reaction mixture.

The amount of lecithin used in the reaction with the hydrolysed bean paste and edible oil may be from about 0.05 to 25%, preferably from 0.1 to 20%, more preferably from 1 to 10% and especially from 2 to 6% by weight based on the weight of the reaction mixture.

After the reaction of the hydrolysed bean paste with the edible oil and lecithin, the reaction mixture is conveniently cooled, e.g. to a temperature from about 20° to about 60° C. to give a mixture of an oil-soluble fried bean flavor and a brown aqueous solution. The oil-soluble fried bean flavor may be separated from the brown aqueous solution by conventional methods, e.g. using a separating funnel or a centrifuge.

The oil-soluble fried bean flavor may be added to a canned bean product before retorting, e.g. by using an automatic nozzle spray. The amount of fried bean flavor added to the canned bean product may be from about 0.1 to 5%, preferably from 0.2 to 2.5% and especially from 0.3 to 1% by weight based on the weight of the canned bean product.

The present invention therefore also provides a canned bean product containing from about 0.1 to 5% by weight based on the weight of the canned bean product of a fried bean flavor prepared by hydrolysing a bean paste with a proteinase and a carbohydrase, and reacting the hydrolysed bean paste at an elevated temperature with an edible fat or oil and lecithin.

The canned bean product of the present invention has a more consistent flavor intensity and profile, contains less oil, and has better sanitation than the fried bean products derived from frying of beans while approximating the flavor of fried beans.

EXAMPLES

The following Examples further illustrate the present invention. Parts and percentages are given by weight unless otherwise stated.

Example 1

100 parts of white beans are soaked in 120 parts water at 25° C. for 3 hours to obtain optimum moisture pick-up of 73 parts, blanched at 95° C. for 5 minutes, and then ground with 300 parts of water to a paste. The bean paste is agitated and heated to 50° C. and liquefied with 1ml of bacterial alpha-amylase liquid (Novo BAN120L, Novo Nordisk Bioindustrials Inc.) at 50° C. for 1 hour at a pH of 5.6. The Novo BAN is an alpha-amylase produced by submerged fermentation of a selected strain of *Bacillus subtilis*. It hydrolyses 1,4-alpha-D-glucosidic linkages in amylose and amylopectin at random, which results in a rapid reduction of the viscosity of gelatinised starch. The breakdown products are dextrins and oligo-saccharides. The bean paste (pH 6.38) is acidified to pH 4.5 with 50% citric acid and saccharified with 1 ml of amyloglucosidase liquid (Novo AMG200L) at 50° C. for 15 hours. The amyloglucosidase is an exo-1,4-alpha-D-glucosidase (glucoamylase) obtained from a selected strain of *Aspergillus niger* by submerged fermentation. The enzyme hydrolyses 1,4- as well as 1,6alpha-linkages in starch.

The bean paste is neutralised to pH 6.0 with 50% caustic soda and its protein is digested using 1ml of neutral protease liquid (Novo Neutrase 0.5L) at 50° C. for 18hours. The neutral protease produced by a selected strain of *Bacillus subtilis* is a metallo protease. Its preferred working conditions are at 45–55° C. and pH 5.5–7.5, optimally at pH 7.5.

44 parts of the enzyme-hydrolysed bean paste is reacted with 400 parts of soybean oil and 18 parts of lecithin in a pressure reactor at 150° C. for 2 hours and then cooled to approximately 40° C. to give a liquid reaction mixture comprising an oil-soluble fried bean flavor and a brown aqueous solution. The oil-soluble fried bean flavor is obtained after separating from the brown aqueous solution using a separating funnel or a centrifuge.

The oil-soluble fried bean flavor is of high strength and is added into a canned bean product before retorting using a high speed automatic nozzle spray in an amount of 0.7% by weight based on the weight of the canned beans to achieve the fried bean flavor. The flavor profile of the canned bean product closely resembles the flavor of fried bean products derived from frying of beans.

Example 2

100 parts of dry white beans are ground using a Fitzmill through a U.S.S. #20 mesh sieve to a powder. The white bean powder is cooked with 300 parts of water at 95° C. for 20 minutes and then cooled to 50° C. The cooked bean paste is further treated with the enzymes by a similar procedure to that described in Example 1 and reacted with soy bean oil and lecithin in a pressure reactor at 140° C. for 4 hours. The oil-soluble fried bean oil is obtained and evaluated as in Example 1. The flavor profile of the canned bean product closely resembles the flavor of fried bean products derived from frying of beans.

What is claimed is:

1. A process for preparing a fried bean flavor which comprises:

preparing a bean paste by combining beans and water;

adding a carbohydrase to the bean paste and partially hydrolysing the bean paste with the carbohydrase at an optimum activity and stability pH for the carbohydrase, with the pH being in the range of about 3 to 8;

adding a protease to the partially hydrolyzed bean paste and further hydrolysing the bean paste with the protease at an optimum activity and stability pH for the protease, with the pH being in the range of about 6 to 8 to form a hydrolysed bean paste;

adding an edible oil and lecithin to the hydrolysed bean paste to form a mixture;

reacting the mixture of the hydrolyzed bean paste, edible oil and lecithin at a temperature of from about 110 to 300° C. for from about 1 minute to 48 hours to form the fried bean flavor, wherein edible oil is present in an amount of from about 5 to 98% by weight and the lecithin is present in an amount of from about 0.05 to 25% by weight, said weights calculated based on the weight of the mixture.

2. A process according to claim 1 wherein the beans employed in the present invention are white beans, soy beans, kidney beans, lima beans, mung beans or snap beans.

3. A process according to claim 1 wherein the bean employed is a bean which will generate a specific flavor and aroma profile approximately, that of the bean used for the canned product.

4. A process according to claim 1 wherein the bean paste is prepared by a method involving heating with sufficient amounts of water and grinding to form the paste.

5. A process according to claim 1 wherein the carbohydrase which is used is a mixture of alpha-amylase and glucoamylase.

6. A process according to claim 1 wherein the protease comprises endopeptidases, exopeptidases or aminopeptidases.

7. A process according to claim 1 wherein the oil used is soybean oil, corn oil, cottonseed oil, olive oil, peanut oil, palm oil, rapeseed oil or sunflower seed oil.

8. A process according to claim 1 wherein the amount of edible oil used in the reaction with the hydrolysed bean paste and lecithin is from about 5 to 98% by weight based on the weight of the reaction mixture.

9. A process according to claim 1 wherein after the reaction of the hydrolysed bean paste with the edible oil and lecithin, the reaction mixture is cooled to give a mixture of an oil-soluble fried bean flavor and a brown aqueous solution and the oil-soluble fried bean flavor is separated from the brown aqueous solution.

10. A process according to claim 1 wherein the carbohydrase is a mixture of alpha-amylase and glucoamylase, the protease comprises an,endopeptidase, exopeptidase or aminopeptidase, and which further comprises cooling the mixture to about 20° to 60° C. after the reacting step to provide an oil-soluble fried bean flavor and aqueous solution and then obtaining the flavor by separation from the solution.

11. A process for preparing a fried bean flavor which comprises:

preparing a bean paste by combining beans and water;

adding a carbohydrase to the bean paste and partially hydrolysing the bean paste with the carbohydrase at an optimum activity and stability pH for the carbohydrase, with the pH being in the range of about 3 to 8;

adding a protease to the partially hydrolyzed bean paste and further hydrolysing the bean paste with the protease at an optimum activity and stability pH for the protease, with the pH being in the range of about 6 to 8 to form a hydrolysed bean paste;

adding an edible fat and lecithin to the hydrolysed bean paste to form a mixture;

reacting the mixture of the hydrolysed bean paste, edible fat and lecithin at a temperature of from about 110° to 300° C. for from about 1 minute to 48 hours to form the fried bean flavor, wherein edible fat is present in an amount of from about 5 to 98% by weight and the lecithin is present in an amount of from about 0.05 to 25% by weight, said weights calculated based on the weight of the mixture.

12. A process according to claim 11 wherein the edible fat is beef tallow, lard, or chicken fat.

\* \* \* \* \*